United States Patent [19]

Burgdörfer et al.

[11] 4,456,642
[45] Jun. 26, 1984

[54] GEL PADS AND A PROCESS FOR THEIR PREPARATION

[75] Inventors: Hans-Heribert Burgdörfer; Dietmar Schäpel, both of Cologne; Gottfried Schneider, Leverkusen; Wulf von Bonin, Leverkusen; Ulrich von Gizycki, Leverkusen, all of Fed. Rep. of Germany

[73] Assignee: Bayer Aktiengesellschaft, Leverkusen, Fed. Rep. of Germany

[21] Appl. No.: 342,033

[22] Filed: Jan. 22, 1982

[30] Foreign Application Priority Data

Feb. 3, 1981 [DE] Fed. Rep. of Germany ....... 3103564

[51] Int. Cl.³ .................... B32B 1/04; B32B 3/02; B32B 27/40
[52] U.S. Cl. .................................. 428/68; 5/449; 428/76; 428/194; 428/423.1
[58] Field of Search ............... 5/449, 450, 451, 441; 521/63, 159, 914; 528/64, 904; 428/68, 76, 423.3, 424.2, 424.8, 194, 423.1

[56] References Cited

U.S. PATENT DOCUMENTS

| | | | |
|---|---|---|---|
| 3,360,495 | 12/1967 | Muller et al. | 260/33.2 |
| 3,663,973 | 5/1972 | Spence | 5/450 |
| 3,737,930 | 6/1973 | Smith | 5/450 |
| 3,847,722 | 11/1974 | Kistner | 528/904 |
| 3,933,548 | 1/1976 | Anderson, Jr. et al. | 428/304.4 |
| 3,939,123 | 2/1976 | Matthews et al. | 521/159 |

FOREIGN PATENT DOCUMENTS 1541071 2/1979 United Kingdom.

*Primary Examiner*—William J. Van Balen
*Attorney, Agent, or Firm*—Gene Harsh; Joseph C. Gil; Lyndanne M. Whalen

[57] ABSTRACT

A gel of specific composition is encased in a flexible elastic casing to form a gel pad. The gel used is made up of (a) 15–62 weight % (based on (a)+(b)) of a high molecular weight covalently cross-linked polyurethane matrix and (b) 85–38 weight % (based on (a)+(b)) of a liquid dispersing agent. The liquid dispersing agent is a polyhydroxy compound having an average molecular weight between 1000 and 12,000, and an OH number between 20 and 112. This dispersing agent contains essentially no hydroxy compounds with a molecular weight below 800. The gel may also include fillers and/or additives known to those in the art. Suitable casing materials include polyurethane films, woven fabrics, knitted fabrics, and mesh fabrics. These gel pads are particularly useful as mattress, mattress inserts, wheelchair cushions, car seats, car seat supports and as pad elements for upholstered furniture.

14 Claims, No Drawings

GEL PADS AND A PROCESS FOR THEIR PREPARATION

BACKGROUND OF THE INVENTION

The present invention relates to pads in which a gel is present within a flexible resilient casing and to a process for their preparation. Such pads are particularly useful as supports for a reclining or sitting person, in mattresses, mattress inserts, wheelchair cushions and car seats.

Gel pads useful as support for a person in a reclining or sitting position are known. A pad with a flexible, elastic nucleus composed of a PVC gel is described, for example, in U.S. Pat. No. 3,737,930. However, such PVC gels having adequate breaking strength can be formulated only with relatively high hardness. The contact pressure in the case of persons lying or sitting on such pads can not therefore be evenly distributed. Such uneven distribution of weight does not prevent development of decubitus by the user. Another disadvantage of gels of this type is the high content of softeners which must be used to obtain a comfortable pad. These softeners can migrate to the surface of the gel from which they may be removed by the person lying or sitting on the pads. Residual monomers of PVC, which are known to be toxicologically unacceptable, may also rise to the gel surface and be removed therefrom by the user of the pad.

Pads for avoiding decubitus are also described in British Pat. No. 1,541,071. The pads disclosed therein contain a thixotropic gel composed of aqueous solutions of 3%–7% of magnesium silicate. However, these gels have so little dimensional stability that they can be used only within a firm frame. Such frames, however, frequently cause pressure points thereby increasing the likelihood of developing decubitus.

U.S. Pat. No. 3,663,973 discloses a pad composed of a polyorganosiloxane gel which is described as being useful for preventing pressure necroses in mammals. However, these polyorganosiloxanes are relatively expensive materials and pads based on these materials can be manufactured only at considerable cost.

The use of water-containing and/or alcohol-containing polyurethane/urea gels as pad elements or shock-preventing components is described in German Auslegeschrift No. 2,347,299. However, the gels disclosed in this Auslegeschrift contain considerable quantities of water and/or low-molecular weight alcohols. These substances are volatile, which leads to drying out and hardening of these gels over relatively long periods of storage. This hardening also occurs if the gels are encased in an elastic film because the permeability of known elastic films to gas and water vapor is not low enough to prevent the escape of the volatile components. The gels described in German Auslegeschrift No. 2,347,299 can therefore only be stored, as pad elements, for a limited time.

Another process for the preparation of pad materials is described in Japanese Patent Application No. 55-3404. These pad materials are prepared by reacting an NCO-prepolymer with a stoichiometric excess of water. However, the pad materials prepared according to this teaching also release water fairly rapidly which results in drying out and loss of the gel's starting properties. This drying out cannot be completely prevented by a film cover because the pad materials disclosed also have a limited lifetime. The high specific heat of these materials (due to the proportionately high quantity of water) is also disadvantageous. The body heat of the user is very rapidly conducted away upon contact with such pad materials resulting in an unpleasant and medically undesired feeling of coldness.

A further disadvantage of the known gel pads for avoiding decubitus is that their properties are relatively invariable. It is therefore difficult to adapt their spectrum of properties to a particular application.

SUMMARY OF THE INVENTION

It is an object of the present invention to provide a pad in which a gel is present within a flexible resilient casing, i.e. a gel pad.

It is another object of the present invention to provide a gel pad which is soft yet elastic, which may have mechanical properties that vary within wide limits and which is stable for relatively long periods of time.

It is also an object of the present invention to provide a gel pad which uniformly distributes pressure in the region of the contact area for sitting or lying persons thereby avoiding pressure points.

It is yet another object of the present invention to provide a gel pad suitable for use as a mattress, mattress insert, wheelchair cushions, bicycle saddle, car seat, car seat support or a pad element for upholstered furniture.

It is a further object of the present invention to provide a process for the production of a gel pad which is soft, elastic and has variable mechanical properties.

These and other objects which will be apparent to those skilled in the art are accomplished by encasing a gel of a specific composition in a flexible elastic casing. The gel comprises (a) 15–62 weight % (based on (a)+(b)) of a high molecular weight covalently cross-linked polyurethane matrix and (b) 85–38 weight % (based on (a)+(b)) of a liquid dispersing agent. The liquid dispersing agent is a polyhydroxy compound having an average molecular weight between 1,000 and 12,000, an OH number between 20 and 112, and contains essentially no hydroxy compounds with a molecular weight below 800. The gel may also include fillers and/or additives known to those in the art.

The term "gel" as used herein is intended to describe the physical nature of the jelly-like or gelatinous end product rather than to represent the exact polymer-physical structure. The term "gel" does not, however, exclude compositions which may have the same homogeneous structure as is generally attributed to gels by those skilled in the art of colloid chemistry, i.e. more or less strongly branched polymer networks which are composed of polyurethane and which may be swollen by additional or excess polyols of molecular weight range of 1,000–12,000. Those materials of gel-like consistency, which contain one or more polyols of molecular weight range 1,000–12,000 as the coherent dispersing agent in which a polymeric network which is coherently linked via urethane bonds and which also shows coherency, is dispersed, are gels in the context of the present invention.

DETAILED DESCRIPTION OF THE INVENTION

According to the present invention a gel pad for avoiding decubitus in which a gel is present within a flexible, elastic casing, (preferably comprising a polymer film or a coated textile) is made with a gel composed of (a) 15 to 62 weight %, preferably 20 to 57 weight %, most preferably 25 to 47 weight % (relative to the sum of components (a) and (b)) of a high molecular weight covalently cross-linked polyurethane matrix; and (b) 85 to 38 weight %, preferably 80 to 43 weight %, most preferably 75 to 53 weight % (relative to the sum of components (a) and (b)) of a liquid dispersing agent which is firmly bonded in the matrix by secondary valence forces; and (c) 0 to 100 weight % (relative to the sum of components (a) and (b)) of one or more fillers and/or other additives.

The liquid dispersing agent of component (b) is one or more polyhydroxy compound having an average molecular weight between 1,000 and 12,000, preferably between 1,700 and 6,000 and an OH number between 20 and 112, preferably between 28 and 84, most preferably between 30 and 56. The dispersing agent should contain essentially no hydroxy compounds with a molecular weight below 800, preferably below 1,000.

Elastic gels which can be used in the present invention which are composed of a covalently crosslinked polyurethane matrix and a polyol which is firmly bonded therein (that is to say, without the danger of a troublesome exudation) may only be formed when the isocyanate or polyol components which react with one another have a certain minimum functionality, and when the polyol is essentially free of constituents with an OH number greater than 112 or a molecular weight below 1,000. Surprisingly, such gels can be prepared by the direct reaction of a polyisocyanate with a higher-molecular weight polyhydroxy compound of the type described above if the characteristic isocyanate number is in the range of from approximately 15 to 60, preferably from 20 to 55, most preferably from 25 to 45, and the polyurethane-forming components (isocyanate and hydroxy compound) are both poly-functional. Otherwise, liquid OH-prepolymers of the type known to those skilled in polyurethane chemistry are formed instead of gels. In the following text, "characteristic isocyanate number" is to be understood as meaning the equivalence ratio (NCO/OH)×100.

In general, the lower the characteristic isocyanate number the more highly functional the polyurethane-forming components have to be in order to obtain a suitable gel. Surprisingly, it is essentially immaterial whether the polyol employed has primary or secondary OH groups. If mixtures of polyols having primary and secondary OH groups are used, the primary polyhydroxy compounds react preferentially with the isocyanate component. Consequently, "functionality of the polyol component" when a mixture of polyols is used is essentially the OH functionality of the primary polyol; however, in the context of the present invention, the total quantity of the polyol component should be included when calculating the characteristic isocyanate number.

In the preparation of the polyurethane matrix, the product of the isocyanate functionality and the polyol functionality should be at least 5.2, preferably at least 6.2, more preferably at least 8, and most preferably at least 10. The stated minimum value of 5.2 may be attained when the characteristic isocyanate number is at the upper end of the acceptable range of the present invention (approximately 60) if a mixture composed of about equivalent quantities of a primary and a secondary hydroxy compound is employed as the polyol component. Where the characteristic isocyanate number is 50 and a purely primary or secondary polyol component is used, the product of the functionalities should be at least 6.2, preferably 8. Where the characteristic isocyanate number is 30 and a purely primary or secondary polyol component is used, the product of the functionalities should be at least 9, preferably at least 10. More detail with respect to achievement of appropriate characteristic isocyanate numbers may be ascertained from the Examples given below.

The present invention also provides a process for the preparation of a gel pad in which a mixture composed of (a) one or more polyisocyanates, (b) one or more polyhydroxy compounds having a molecular weight between 1,000 and 12,000 (preferably between 1,700 and 6,000) and an OH number between 20 and 112 (preferably between 28 and 84, most preferably between 30 and 56), (c) if appropriate, a catalyst for the reaction between isocyanate groups and hydroxyl groups, and as desired, (d) one or more fillers and/or other additive(s) known to those skilled in polyurethane chemistry is allowed to gel and the gel is provided with a flexible, elastic casing. This gel-forming mixture is essentially free of hydroxyl compounds having a molecular weight of below 800, (preferably below 1,000), has a characteristic isocyanate number between 15 and 60, and a product of the functionalities of the polyurethane-forming components which is at least 5.2, preferably at least 6.2, more preferably at least 8, and most preferably at least 10.

It is particularly surprising that the gels of the present invention are exceptionally stable. Even after relatively long periods of storage, no substantial phase separation occurs. The polyol dispersing agent must therefore be very firmly bonded in the gel. By choice of suitable mixing combinations, gels can be obtained in which the dispersing agent is not given off even at temperatures of 50° to 100° C. In view of the fact that the gels are insoluble in dimethylformamide, it would appear that at least some of the polymer chains in the gels of the present invention are covalently cross-linked, while the remaining part of the polymer chains is bonded via secondary valence forces and mechanical loops.

Besides their function as synthesizing components for the polyurethane matrix, the polyol or polyols also act as a dispersing agent. The higher-molecular weight polyols used in the present invention are preferably the polyhydroxy polyesters, polyhydroxy polyethers, polyhydroxy polythioethers, polyhydroxy polyacetals, polyhydroxy polycarbonates or polyhydroxy polyester-amides of the molecular weight range given above, which compounds are liquid at room temperature. Such compounds are known to those in the art of polyurethane chemistry.

Reaction products of polyhydric (preferably dihydric and, if appropriate, also trihydric) alcohols with polybasic (preferably dibasic) carboxylic acids are examples of suitable polyesters having hydroxyl groups. Instead of the free polycarboxylic acids, the corresponding polycarboxylic acid anhydrides or corresponding polycarboxylic acid esters of low molecular weight alcohols, or mixtures thereof, can also be used in the preparation of the polyesters. The polycarboxylic acids can be of an aliphatic, cycloaliphatic, aromatic and/or heterocyclic nature and, if appropriate, can be substituted (for example by halogen atoms) and/or unsaturated.

Examples of suitable carboxylic acids and derivatives thereof include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylenetetrahydrophthalic acid anhydride, glutaric acid anhydride, maleic acid, maleic acid anhydride, fumaric acid and dimerized and trimerized unsaturated fatty acids which if appropriate are mixed with monomeric unsaturated fatty acids (such as oleic acid), dimethyl terephthalate and bis-glycol terephthalate. Ethylene glycol, 1,2-propylene glycol, 1,3-propylene glycol, 1,4-butylene glycol, 2,3-butylene glycol, hexane-1,6-diol, octane-1,8-diol, neopentyl glycol, 1,4-bis-hydroxymethylcyclohexane, 2-methyl-1,3-propanediol, glycerol; trimethylolpropane, hexane-1,2,6-triol, butane-1,2,4-triol, trimethylolethane, pentaerythritol, quinitol, mannitol, sorbitol, formitol and methyl glycoside, diethylene glycol, triethylene glycol, tetraethylene glycol and higher polyethylene glycols, dipropylene glycol and higher polypropylene glycols, and dibutylene glycol and higher polybutylene glycols are examples of suitable polyhydric alcohols. The polyesters prepared from such materials can have a proportion of terminal carboxyl groups. Polyesters of lactones (for example ε-caprolactone) or of hydroxycarboxylic acids (for example ω-hydroxycaproic acid) can also be employed as dispersing agents in the practice of the present invention.

The polyethers which are suitable in the present invention have at least two, (generally two to eight, and preferably two to three) hydroxyl groups. Appropriate polyethers are known to those in the art. Such polyethers may be prepared, for example, by polymerization of epoxides, such as ethylene oxide, propylene oxide, butylene oxide, tetrahydrofuran, styrene oxide or epichlorohydrin. Such polymerization may be carried out using only the epoxide itself or in the presence of a Lewis catalyst, such as $BF_3$. Such polyethers may also be produced by addition of such epoxides (preferably of ethylene oxide and propylene oxide) optionally in a mixture or successively, onto starting components having reactive hydrogen atoms. Examples of appropriate reactive hydrogen-containing compounds are water, alcohols, ammonia and amines. Specific examples are ethylene glycol, 1,3-propylene glycol, 1,2-propylene glycol, trimethylolpropane, glycerol, sorbitol, 4,4'-dihydroxy-diphenylpropane, aniline, ethanolamine and ethylenediamine. Sucrose polyethers, such as those described, in German Auslegeschriften Nos. 1,176,358 and 1,064,938, and polyethers started from formitol or formose described for example in German Offenlegungsschriften Nos. 2,639,083 or 2,737,951, are also suitable to the present invention. Those polyethers which have predominantly (i.e. up to 90 weight % relative to all OH groups present in the polyester) primary OH groups are generally preferred. Polybutadienes which have OH groups are also suitable for the present invention.

Among the polythioethers which may be used in the present invention are the condensation products of thiodiglycol with itself and/or with other glycols, dicarboxylic acids, formaldehyde, aminocarboxylic acids or aminoalcohols. Depending upon the co-components, the condensation products may be mixed polythioethers, polythioether esters or polythioether esteramides.

Compounds which can be prepared from glycols, such as diethylene glycol and triethylene glycol, 4,4'-dihydroxyethoxydiphenyldimethylmethane, hexanediol and formaldehyde are examples of suitable polyacetals. Polyacetals which may be employed in the present invention can also be prepared by polymerization of cyclic acetals, such as trioxane (see German Offenlegungsschrift No. 1,694,128).

Suitable polycarbonates can be prepared by reaction of diols (such as propane-1,3-diol, butane-1,4-diol and/or hexane-1,6-diol, diethylene glycol, triethylene glycol, tetraethylene glycol or thiodiglycol) with diaryl carbonates, (for example diphenyl carbonate) or phosgene (see German Auslegeschriften Nos. 1,694,080, 1,915,908 and 2,221,751; and German Offenlegungsschrift No. 2,605,024).

The polyester-amides and polyamides which may be used as the dispersing agent include the predominantly linear condensates obtained from polybasic saturated or unsaturated carboxylic acids, or anhydrides thereof, and polyhydric saturated or unsaturated aminoalcohols, diamines, polyamines and mixtures thereof.

Polyhydroxy compounds which already contain urethane groups or urea groups, as well as optionally modified natural polyols (such as castor oil) can also be used as the dispersing agent.

Polyhydroxy compounds in which high-molecular weight polyadducts or polycondensates, or polymers, are contained in finely dispersed or dissolved form may also be employed in the present invention. Polyhydroxy compounds of this type are obtained, for example, if polyaddition reactions (for example reactions between polyisocyanates and amino-functional compounds) or polycondensation reactions (for example between formaldehyde and phenols and/or amines) are allowed to take place in situ in the above-mentioned compounds having hydroxyl groups. Processes of this type are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833; 2,550,862; 2,633,293 and 2,639,254. However, it is also possible, according to U.S. Pat. No. 3,869,413 or German Offenlegungsschrift No. 2,550,860, to mix a prepared aqueous polymer dispersion with a polyhydroxy compound and then to remove the water from the mixture.

Polyhydroxy compounds modified by vinyl polymers, which are obtained by the polymerization of styrene and acrylonitrile in the presence of polyethers (U.S. Pat. Nos. 3,383,351; 3,304,273; 3,523,093 and 3,110,695; German Auslegeschrift Nos. 1,152,536) or polycarbonate polyols (German Patent Specification No. 1,769,795; U.S. Pat. No. 3,637,909), are also suitable for the present invention. When polyether polyols which have been modified, according to German Offenlegungsschriften Nos. 2,442,101; 2,644,922 and 2,646,141, (by graft polymerization with vinyl phosphonates and, if appropriate, (meth)acrylonitrile (meth)acrylamide or OH-functional (meth)acrylates) are used, gels which are flame repellant are obtained.

Representatives of the polyhydroxy compounds which may be used as a dispersing agent in the present invention are described in High Polymers, Volume XVI, "Polyurethanes, Chemistry and Technology", edited by Saunders-Frisch Interscience Publishers, New York, London, Volume I, 1962, pages 32–42 and pages 44–54, and Volume II, 1964, pages 5–6 and 198–199, and in Kunststoff-Handbuch (Plastics Handbook), Volume VII, Vieweg-Hochtlen, Carl-Hanser-Verlag, Munich, 1966, on pages 45–71. It is, of course, possible to employ mixtures of the above-mentioned compounds, for example mixtures of polyethers and polyesters.

Polyhydroxypolyethers of the type described above which are in themselves known in polyurethane chemistry and which have 2 to 4 (preferably 3) hydroxyl groups per molecule, are the preferred higher molecular weight polyols suitable to the present invention. Those polyhydroxypolyethers which have terminal ethylene oxide units (and therefore primary hydroxyl groups) are particularly preferred among the polyhydroxy-polyethers. If appropriate, such polyhydroxy polyethers may be used as components of a mixture with other polyethers. In these compounds, the proportion of ethylene oxide sequences in the polyether is preferably at least 15 weight %, most preferably at least 20 weight %.

In the preparation of the gels of the present invention, aliphatic, cycloaliphatic, araliphatic, aromatic and heterocyclic polyisocyanates may be employed. Appropriate polyisocyanates are described, for example, by W. Siefken in Justus Liebigs Annalen der Chemie, 562, pages 75 to 136. Appropriate polyisocyanates include those corresponding to the formula $$Q(NCO)_n$$

in which n is 2, 3, or 4, preferably 2, and

Q denotes an aliphatic hydrocarbon radical; having 2 to 18 (preferably 6 to 10) carbon atoms; a cycloaliphatic hydrocarbon radical having 4 to 15 (preferably 5 to 10) carbon atoms; an aromatic hydrocarbon radical having 6 to 15 (preferably 6 to 13) carbon atoms; or an araliphatic hydrocarbon radical having 8 to 15 (preferably 8 to 13) carbon atoms.

Specific examples of such polyisocyanates are ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-diisocyanate and cyclohexane-1,4-diisocyanate and any desired mixture of these isomers; 1-isocyanato-3,3,5-trimethyl-5-isocyanatomethylcyclohexane (German Auslegeschrift No. 1,202,785 and U.S. Pat. No. 3,401,190), hexahydrotoluylene-2,4-diisocyanate and hexahydrotoluylene-2,6-diisocyanate, and any desired mixtures of these isomers;

hexahydrophenylene-1,3-diisocyanate and/or hexahydrophenylene-1,4-diisocyanate, perhydro-diphenyl methane 2,4'-diisocyanate and/or perhydro-diphenyl methane-4,4'-diisocyanate, phenylene-1,3-diisocyanate, phenylene-1,4-diisocyanate, toluylene-2,4-diisocyanate and toluylene-2,6-diisocyanate, and any desired mixtures of these isomers; diphenylmethane-2,4'-diisocyanate and/or diphenylmethane-4,4'-diisocyanate and naphthylene-1,5-diisocyanate.

The following are also examples of isocyanates which are suitable to the present invention: triphenyl-methane-4,4',4''-triisocyanate; polyphenyl-polymethylene polyisocyanates, as obtained by aniline/formaldehyde condensation and subsequent phosgenation (described, for example, in British Pat. No. 874,671); m- and p-isocyanatophenylsulphonyl isocyanates (U.S. Pat. No. 3,277,138); polyisocyanates having carbodiimide groups (described in German Pat. Specification No. 1,092,007 (U.S. Pat. No. 3,152,162) and in German Offenlegungsschriften Nos. 2,504,400, 2,537,685 and 2,552,350); norbornane diisocyanates (U.S. Pat. No. 3,492,330); polyisocyanates having allophanate groups (described in British Pat. No. 994,890, Belgian Patent Specification No. 761,626 and Dutch Patent Application No. 7,102,524); polyisocyanates having isocyanurate groups (U.S. Pat. No. 3,001,973, German Patent Specifications Nos. 1,022,789, 1,222,067 and 1,027,394 and in German Offenlegungsschriften Nos. 1,929,034 and 2,004,048; polyisocyanates having urethane groups (Belgian Pat. No. 752,261) or U.S. Pat. Nos. 3,394,164 and 3,644,457); polyisocyanates which have acylated urea groups (German Pat. No. 1,230,778) polyisocyanates having biuret groups (U.S. Pat. Nos. 3,124,605, 3,201,372 and British Pat. No. 889,050); polyisocyanates prepared by telomerization reactions (described in U.S. Pat. No. 3,654,106) polyisocyanates having ester groups (British Patent Specification Nos. 965,474 and 1,072,956, U.S. Pat. No. 3,567,763 and German Pat. No. 1,231,688); reaction products of the above-mentioned isocyanates with acetals (German Pat. No. 1,072,385) and polyisocyanates which contain polymeric fatty acid esters (U.S. Pat No. 3,455,883).

It is also possible to employ distillation residues which are produced in industrial isocyanate production in the present invention. These residues may be dissolved, if appropriate, in one or more of the above-mentioned polyisocyanates. It is also possible to use mixtures of the above-mentioned polyisocyanates.

Toluylene-2,4-diisocyanate and toluylene 2,6-diisocyanate, and any desired mixtures of these isomers; polyphenyl-polymethylene polyisocyanates prepared by aniline/formaldehyde condensation and subsequent phosgenation; and polyisocyanates having carbodiimide groups, urethane groups, allophanate groups, isocyanate groups, urea groups or biuret groups are examples of preferred isocyanates.

Biuretized or trimerized hexamethylene-1,6-diisocyanate, and addition products onto short-chain or long-chain polyols containing NCO groups, as well as mixtures of these isocyanates, are examples of particularly preferred polyisocyanates.

The content of diisocyanate and/or polyisocyanate in the gel-forming mixtures according to the present invention is 1–20 weight %, preferably 2–15 weight % relative to the total weight of the mixture.

The gel-formation reaction, which in itself proceeds slowly, can be accelerated by the addition of catalysts. Suitable catalysts are those known to accelerate the reaction between hydroxyl groups and isocyanate groups. Suitable catalysts include, tertiary amines, such as triethylamine, tributylamine, N-methylmorpholine, N-ethyl-morpholine, N-(coconut alkyl)-morpholine, N,N,N',N'-tetramethyl-ethylene diamine, 1,4-diazabicyclo-(2,2,2)-octane, N-methyl-N'-dimethylaminoethyl-piperazine, N,N-dimethyl-benzylamine, bis-(N,N-diethylaminoethyl) adipate, N,N-dimethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole. Mannich bases which are in themselves known and are derived from secondary amines (such as dimethylamine), and aldehydes (preferably formaldehyde), or ketones (such as acetone, methyl ethyl ketone or cyclohexanone) and phenols (such as phenol, nonylphenol or bisphenol) are also suitable as catalysts.

Sila-amines containing carbon-silicon bonds, as described, for example, in German Pat. No. 1,229,290 (corresponding to U.S. Pat. No. 3,620,984) such as 2,2,4-trimethyl-2-silamorpholine and 1,3-diethylaminomethyl-tetramethyl-disiloxane are also suitable catalysts.

Nitrogen-containing bases (such as tetraalkylammonium hydroxides) alkali metal hydroxides (such as sodium hydroxide), alkali metal phenolates (such as sodium phenolate) or alkali metal alcoholates (such as sodium methylate) are also suitable as catalysts. Hexahydrotriazines can also be employed as catalysts.

Organic metal compounds, particularly organic tin compounds, can also be used in the present invention as catalysts. Tin(II) salts of carboxylic acids, such as tin (II) acetate, tin(II) octoate, tin(II) ethylhexoate and tin(II)laurate; and the tin(IV) compounds, for example dibutyl-tin oxide, dibutyl-tin chloride, dibutyl-tin acetate, dibutyl-tin dilaurate, dibutyl-tin maleate or dioctyl-tin acetate, are preferred organic tin compounds. Of course, all of the above-mentioned catalysts can be employed as mixtures.

Further representatives of catalysts which may be used in the present invention and details of their mode of action are described in Kunststoff-Handbuch (Plastics Handbook), Volume VII, edited by Vieweg and Hochtlen, Carl-Hanser-Verlag, Munich, 1966, on pages 96-102.

The catalysts are preferably employed in a quantity of between 0.1 and 10 weight %, relative to the total weight of the gel.

The fillers and additives optionally contained in the gels of the present invention are materials which are in themselves known in polyurethane chemistry. They include fillers and short fibers with an organic or inorganic basis, metal powders, coloring agents (such as dyestuffs and colored pigments), water-binding agents, surface-active substances, flameproofing agents, liquid extenders (such as substances with a boiling point of above 150° C.), and plasticizers (such as are customarily added to polymers, like polyvinyl chloride), for decreasing hardness.

Baryte, chalk, gypsum, kieserite, sodium carbonate, titanium dioxide, quartz sand, kaolin, carbon black and microglass beads are examples of suitable inorganic fillers. Powders based on polystyrene, polyvinyl chloride, urea/formaldehyde and polyhydrazodicarboxamide (for example from hydrazine/toluylene diisocyanate) can be employed as organic fillers. The above-described urea/formaldehyde resin or the polyhydrazodicarboxamide can be prepared in the polyol used in the gel formation.

Glass fibers of 0.1-1 cm length or fibers of organic origin, such as, for example, polyester fibers or polyamide fibers, are examples of suitable short fibers. Metal powders such as iron powder or copper powder may also be used in the gel formation. The dyestuffs or colored pigments are known to be useful in the coloration of polyurethanes and may have an organic or an inorganic basis. Such coloring agents include iron oxide pigments, chromium oxide pigments and pigments which have a phthalocyanine basis or a monoazo basis. Zeolite is the preferred water-binding agent. Cellulose powder, active charcoal, silicic acid preparations and chrysotile-asbestos are examples of surface-active substances.

Sodium polymetaphosphates can be added to the gel composition as flameproofing agents. Alkyl-substituted, alkoxy-substituted or halogen-substituted aromatic compounds (such as dodecylbenzene, m-dipropoxybenzene or o-dichlorobenzene), halogenated aliphatic compounds (such as chlorinated paraffins), organic carbonates (such as propylene carbonate), carboxylic acid esters (such as dioctyl phthalate) or dodecylsulfonic acid esters or organic phosphorus compounds (such as tricresyl phosphate) can be used as liquid extenders.

Esters of polybasic (preferably dibasic) carboxylic acids with monohydric alcohols are examples of appropriate plasticizers. Examples of such polycarboxylic acids are: succinic acid, isopthalic acid, trimellitic acid, phthalic acid anhydride, tetrahydrophthalic acid anhydride, hexahydrophthalic acid anhydride, endomethylene-tetrahydrophthalic acid anhydride, glutaric acid anhydride, maleic acid anhydride, fumaric acid and dimeric and trimeric fatty acids (such as oleic acid) which, if appropriate are mixed with monomeric fatty acids. Branched and unbranched aliphatic alcohols having 1-20 carbon atoms, such as methanol, ethanol, propanol, isopropanol, n-butanol, sec.-butanol, tert.-butanol, and the various isomers of pentyl alcohol, of hexyl alcohol, of octyl alcohol (for example 2-ethylhexanol), of nonyl alcohol, of decyl alcohol, of lauryl alcohol, of myristyl alcohol, of cetyl alcohol and of stearyl alcohol, as well as the fatty alcohols and wax alcohols which occur naturally or which can be obtained by the hydrogenation of naturally occurring carboxylic acids, are suitable monohydric alcohols. Cyclohexanol and its homologues are examples of cycloaliphatic alcohols. Aromatic hydroxy compounds, such as phenol, cresol, thymol, carvacrol, benzyl alcohol and phenylethanol, can also be employed.

Phosphoric acid esters of the above-mentioned branched and unbranched aliphatic, cycloaliphatic and aromatic alcohols are also suitable as plasticizers. If appropriate, phosphates of halogenated alcohols, for example, trichloroethyl phosphate, can also be employed. Such phosphates of halogenated alcohols are particularly advantageous in that they also impart a flame-retarding finish to the gels of the present invention. Of course, mixed esters of the above-mentioned alcohols and carboxylic acids can also be employed.

So-called polymeric plasticizers can also be employed. Polyesters of adipic acid, sebacic acid or phthalic acid are examples of such commercial polymeric plasticizers.

Phenol alkysulfonates, for example phenyl paraffin-sulfonates, can also be used as plasticizers.

The content of fillers, extenders and/or plasticizers in the gels of the present invention can be up to 50 weight %, relative to the total weight of the gel.

The process for the preparation of the polyurethane gels of the present invention should preferably be carried out at room temperature. However, the reaction temperature can be increased up to 100° C. to increase the reaction rate. Although a further increase in the reaction temperature is possible, there is no advantage to using such higher temperatures since the reaction occurs very rapidly making it difficult to handle the gel-forming composition and increasing the danger of the formation of inhomogeneties.

On the other hand, if a gel reaction which proceeds slowly is desired, the reaction temperature can be decreased as desired down to the pour point of the reaction components. However, a sufficiently slow reaction is already achieved at a temperature of 0° C., in most cases.

The preparation of the gels of the present invention can be accomplished in various ways. The process can be carried out as a one-shot process or a prepolymer process. In the one-shot process, all the components (i.e.

polyols, diisocyanates and/or polyisocyanates catalysts and, if appropriate, fillers and additives) are simultaneously added together and mixed intensively with one another.

Two prepolymer processes may be used. In one of the procedures an isocyanate prepolymer is first prepared by reacting an appropriate proportion of the polyol with the total quantity of isocyanate provided for the gel formation. The residual quantity of polyol and, if appropriate, fillers and additives are then added to the prepolymer obtained, and the substances are intensively mixed. In the other prepolymer procedure, the total quantity of polyol provided for the gel formation is reacted with part of the total quantity of isocyanate to give a hydroxy prepolymer. The residual quantity of isocyanate is then mixed into the mixture.

A procedure which is particularly advantageous according to the present invention is a variant of the one-shot process and the hydroxy prepolymer process. In this process, the polyol or polyol mixture, any appropriate fillers and additives, the catalysts and two different diisocyanates are added together in one charge and are intensively mixed. One of the diisocyanates used in the procedure should be aromatic and the other diisocyanate aliphatic. Due to the greatly differing reactivities of two such diisocyanates, a hydroxy prepolymer should be formed first. This hydroxy prepolymer then reacts, within minutes, with the other diisocyanate, resulting in the formation of a gel. Gels with a particularly high toughness are thus obtained.

In the procedures employed in making the gels used in the present invention, the conveying, metering and mixing of the individual components or component mixtures can be effected using devices which are known to those skilled in the art of polyurethane chemistry.

It is particularly surprising that, even in the case of relatively low characteristic isocyanate numbers (for example 30) and a polyol component with uniformly reactive OH groups (so that a selective reaction of a part of the polyol component with the polyisocyanate is not to be expected), gels with a high-molecular weight, cross-linked matrix which is insoluble in dimethylformamide, rather than liquid polyols modified by urethane groups (OH-prepolymers) are obtained.

The gels of the present invention are, in the hardened state, deformably elastic bodies which retain their shape. The starting components and quantities used may be varied in a manner such that the gel consistency is varied within wide limits. However, those gels which have a soft, somewhat tacky, gelatinous consistency are preferably employed in making the pads of the present invention. This soft tacky consistency is achieved by choice of appropriate starting components in appropriate amounts. Such gels are particularly advantageous for making gel pads because the pads formed return to their starting state after a deforming force ceases to operate upon the pad.

The deformability under pressure of the gels used in the present invention makes them particularly suitable for their use as pads which prevent decubitus.

Generally held medical opinion teaches that, decubitus is produced, inter alia , if the contact pressure on the individual parts of the body exceeds the capillary pressure for a relatively long period of time. A disturbance caused by such pressure, occurs in the skin metabolism. This state is reached after a relatively short time, particularly in the case of bedridden patients and especially in the case of patients incapable of movement. Under the contact pressure of a person lying, sitting or standing thereon, the pads of the present invention are capable of deformation in such a manner that they flow around the corresponding part of the body, so that the particular part of the body virtually floats in a coherent dispersing agent. In this manner, the contact pressure is uniformly distributed over the total contact surface, particularly at projecting parts of the body. Such uniform distribution reduces the contact pressure to such an extent that the disturbance in the skin metabolism is substantially reduced. The danger of decubitus can therefore be substantially reduced if bedridden patients and patients incapable of movement are lain or sat upon the gel pads of the present invention.

The gels used according to the invention generally have a soft, somewhat tacky, gelatinous consistency. For better manipulation of these gels as pads which distribute the contact pressure, it is necessary in practice to provide them with a casing. The casing must be formed in such a manner that it offers as little resistance as possible to the deformation tendency of the gel under pressure.

Elastic films can be used as one such casing. Any of the polymer films with a good viscoelastic behavior (measured, for example, in the biaxial impact penetration test according to DIN (German Industrial Standards) 55,373) and high elongation at break and breaking force (measured, for example, according to DIN (German Industrial Standards) 53,455) are particularly suitable. Such films include polyurethane films such as those sold under the trademarks "Waloplast" PUR by Wolff-Walsrode, or "Platilon" sold by Plate. Suitable films can also be prepared from thermoplastic polyester elastomers, for example, that sold under the trademark "Hytrel" (DuPont) and from block copolymers based on styrene and butadiene, and such copolymers mixed with polyolefins. Suitable block copolymers based on styrene are, for example, the products available under the trademark "Cariflex" (Shell). Styrene/ethylene/butylene/styrene block copolymers are also suitable. Such block copolymers are available, for example, from Shell under the trademark "Kraton". Other suitable films are those composed of ethylene/vinyl acetate polymers (if appropriate in combination with other polymer films) as well as thin films of natural or synthetic rubber materials. It is also possible to use films of plasticized polyvinyl chloride. Such films can be thermally shaped, welded or subjected to adhesive bonding. With the aid of these techniques, it is quite simple to prepare suitable covers for the gel pads of the present invention from these films.

In one embodiment of the present invention covers for the gel pads can be prepared by a process in which a covering film is welded onto or adhesively bonded onto deep-drawn articles composed of these films. In another embodiment two deep-drawn half-shells of such films are adhesively bonded or welded to each other.

Coated resilient textile sheet-like structures, such as woven fabrics, knitted fabrics, mesh fabrics and fleece composed of natural or synthetic, organic or inorganic fiber materials having a resilient character, with a high elongation at break and breaking force (according to DIN (German Industrial Standards) 53,455) are also particularly suitable materials.

Resilient polyurethane coatings, such as those available from BAYER AG under the trademark "Impranil", are particularly suitable coatings. However, it is also possible to employ coatings based upon plasticized polyvinyl chloride.

These coated textile sheet-like structures can be sewn, adhesively bonded or welded. It is relatively simple to prepare from these coated textile sheet-like structures suitable covers for the gel pads according to the present invention.

The gels of the present invention can also be encased by a process in which a resilient material, in liquid or dissolved form, is applied to the gel surface and is allowed to solidify or to undergo another film-forming reaction thereon. Coating materials based on polyurethane (such as those available from BAYER AG under the trademark "Impranil") in solution or as a dispersion, are applied onto the gels of the present invention. A suitable resilient casing is thereby obtained after the solvent or dispersing agent has been stripped off. Suitable flexible casings are also obtained if the gels are coated with a two-component lacquer which forms a polyurethane.

The gel pads can be prepared in various ways. For example, the gel can first be prepared in a mold (in the manner described in German Offenlegungsschrift No. 2,347,299), and the pressure-resistant gel can be encased with a flexible film or a flexible material, or lacquered or coated after it has gelled completely. However, it is also possible to mix the gel components with a static mixer, to introduce the mixture onto a continuously operating conveyor belt, and to allow the mixture to react to completion there. In this manner, relatively large gel discs may be obtained. These large gel discs can be cut into pieces of any desired size and the individual pieces can then be provided with a casing, or lacquered or coated.

The preparation of the gel pads is, however, preferably carried out by the following very simple procedure. The components necessary for the preparation of the gel are mixed by means of a static or dynamic mixer. The mixture is then poured directly into a cover composed of resilient, flexible film or resilient, coated textile sheet-like structure. After the mixture has been added, the cover is tightly closed and the pad is left alone for the gel formation. If appropriate, the pad in the casing can also be placed, between two plane-parallel plates or in a suitable mold during the gel formation. A gel pad with essentially parallel upper and lower sides, or a gel pad in a form corresponding to the inside of the mold is thereby formed. Depending upon the type of reaction components, the catalysts added and the regulation of the temperature, the gel time may be from approximately 5 minutes to about 24 hours. This preferred procedure allows the preparation of gel pads of any desired size and shape simply by filling pad cases of the desired shape with the gel-forming composition. Particularly preferred shapes and sizes are square pads with an edge length of 30–60 cm and rectangular pads which correspond in dimensions to a conventional mattress of 80–100 cm width and 180–200 cm length.

The thickness of the gel pad of the present invention can also be varied within wide limits. However, it has been found that, when used as a seat cushion, (preferably a square cushion with an edge length of 40–60 cm) the best results are achieved with a thickness greater than 2 cm. When used as a mattress or mattress insert, a less thick gel pad can be used since the contact pressure is distributed over a relatively large body area.

The present invention is illustrated by the Examples which follow. The quantity data given therein are to be understood as meaning percentage by weight or parts by weight, unless otherwise indicated.

The pressure values given in the following Examples have been measured between the sacral or ischial projections of an artificial posterior, shaped from plastic and loaded with 35 kg, and a gel pad or foam pad lying on a level, hard support. The load occurring in this case corresponds approximately to that which a sitting person would exert on the pad. The pressure values are relative pressure units, the absolute values of which are also determined by the measuring apparatus. These pressure values are intended to merely serve the purpose of comparing the gel pads according to the invention with conventional mattress foams.

EXAMPLES

EXAMPLE 1

3,500 parts of a polyether based on trimethylolpropane with a hydroxyl number of 56 (prepared from 45% of propylene oxide and 55% of ethylene oxide), 700 parts of a polyether based on trimethylolpropane with a hydroxyl number of 34 (prepared from 83% of propylene oxide and 17% of ethylene oxide) and 2,800 parts of a polyether based on propylene glycol with a hydroxyl number of 56 (prepared from 100% of propylene oxide) were stirred at a temperature of 22° C., by means of a laboratory mixer with a disc stirrer. A clear solution was obtained. 301 parts of a biuret polyisocyanate which had an isocyanate content of 21 weight %, an average functionality of 3.6 and an average molecular weight of 700 (prepared from hexamethylene diisocyanate by a biuretization reaction, (specifically the compound known by the trademark "Desmodur" N (BAYER AG)) were added to this solution with stirring, and distributed thoroughly. 105 parts of dibutyl-tin dilaurate were added to the solution which was then cloudy, and the mixture was intensively mixed for 3 minutes. The whitish cloudy solution was poured into a prepared, square casing of polyurethane film of film thickness 0.2 mm, with an edge length of 45 cm. The film casing was welded so that it was airtight. The gel ped was laid on an even base and left alone to undergo a gel reaction, so that the gel pad reached its final mechanical strength and could be fully loaded. It was a soft body which retained its shape and could be deformed under pressure. If the deforming force was removed, the gel pad returned to its starting state.

When the pad was subjected to a load using an artificial posterior shaped from plastic and loaded with 35 kg, a pressure of 44 pressure units (DE) was measured at the sacrum and a pressure of 48 (DE) was measured at the ischial projections.

EXAMPLE 2

(Comparison Example)

A foam pad composed of a commercial polyether foam with a weight per unit volume (according to DIN (German Industrial Standards) 53,420) of 35 kg/m$^3$ and a hardness to compression (40%) (according to DIN (German Industrial Standards) 53,571) of 3.3 KPa, as customarily used for the manufacture of pad elements and mattresses, was provided with a film casing of polyurethane film like that used in Example 1. The pad which was thus encased was subjected to a load using an artificial posterior, in the same manner as described in Example 1. In this test, a pressure of 109 DE was measured at the sacrum and a pressure of 34 DE was measured at the ischial projections.

EXAMPLE 3

A gel-forming mixture was prepared according to the procedure described in Example 1 and was poured into a square casing of resilient film, in the same manner as in Example 1. The casing was prepared from a 0.2 mm thick film composed of a polymer blend of 50 parts of polypropylene and 50 parts of a styrene/butadiene block copolymer, instead of from polyurethane film. After the gel reaction had ended, a soft gel pad which retained its shape and which could be deformed under pressure was obtained. The gel pad returned to its starting state when the deforming force was removed.

The gel pad obtained in this manner was subjected to a load using an artificial posterior, as described in Example 1. In this test, a pressure of 18 DE was measured at the sacrum and a pressure of 19 DE was measured at the ischial projections.

EXAMPLE 4

A gel-forming mixture prepared according to the procedure described in Example 1 was poured into a square casing. The casing was prepared from a resilient textile provided with a resilient polyurethane coating instead of from polyurethane film. After the gel reaction had ended, a soft gel pad which retained its shape and which could be deformed under pressure was obtained. This gel pad returned to its starting state when the deforming force was removed. The gel pad obtained in this manner was subjected to a load using an artificial posterior, as described in Example 1. In this test, a pressure of 32 DE was measured at the sacral projection and a pressure of 28 DE was measured at the ischial projections.

EXAMPLE 5

3,500 parts of a polyether based on trimethylolpropane with a hydroxyl number of 56 (prepared from 45% of propylene oxide and 55% of ethylene oxide), 700 parts of a polyether based on trimethylolpropane with a hydroxyl number of 34 (prepared from 83% of propylene oxide and 17% of ethylene oxide), 2800 parts of a polyether based on propylene glycol with a hydroxyl number of 56 (prepared from 100% of propylene oxide) and 35 parts of dibutyl-tin dilaurate were mixed in a vessel with stirring at 22° C. to give a homogeneous mixture. The mixture was fed to a static mixer by means of a gear pump. 273 parts of the biuret polyisocyanate from Example 1 were simultaneously fed to this mixer from a separate storage container, in a manner such that the mixing ratio of the two components was identical and corresponded to the proportions of the total quantities. The whitish cloudy solution from the static mixer was poured into a square casing such as that described in Example 4. A gel pad in the form of a cushion was prepared therefrom in the manner described in Example 1.

After the gel reaction has ended, a soft gel pad which retained its shape and which could be deformed under pressure was obtained. This gel pad returned to its starting state when the deforming force was removed.

The gel pad obtained in this manner was subjected to a load using an artificial posterior, as described in Example 1. In this test, the following pressure values were measured: sacral projection 31 DE; ischial projections 23 DE.

EXAMPLE 6

1,000 parts of a polyether based on trimethylolpropane with a hydroxyl number of 36 (prepared from 80% of propylene oxide and 20% of ethylene oxide), 50 parts of the biuret polyisocyanate from Example 1 and 15 parts of dibutyl-tin dilaurate were intensively mixed during the course of 1 minute at room temperature with a laboratory stirrer. After 10 minutes, a cloudy, resilient gel which retained its shape was obtained. This gel could easily be deformed under the influence of a force acting upon it and resumed its starting state after removal of the deforming force.

EXAMPLE 7

1,000 parts of a polyether based on sorbitol with a hydroxyl number of 46 (prepared from 100% of propylene oxide), 25 parts of toluylene diisocyanate (80% of the 2,4-isomer and 20% of the 2,6-isomer) and 30 parts of dibutyl-tin dilaurate were intensively mixed during the course of 1 minute at room temperature with a laboratory stirrer. A soft, resilient gel which retained its shape was obtained. This gel could easily be deformed under the influence of a force which acted upon it and resumed its starting state after removal of the deforming force.

EXAMPLE 8

1,000 parts of the polyether described in Example 7, 45 parts of 4,4'-diisocyanato diphenylmethane (which had been modified by a urethanization reaction with tripropylene glycol and which had an isocyanate content of 23 weight %) and 30 parts of dibutyl-tin dilaurate were mixed with a laboratory stirrer in the same manner as described in Example 7. A soft, resilient gel which retained its shape was obtained. This gel could easily be deformed under the influence of a force which acted on it and resumed its starting state after removal of the deforming force.

EXAMPLE 9

1,000 parts of a polyether based on glycerol with a hydroxyl number of 28 (prepared from 40% of propylene oxide and 60% of ethylene oxide) were reacted with 50 parts of the polyisocyanate according to Example 8 and 30 parts of dibutyl-tin dilaurate in accordance with the procedure described in Example 7. A soft, resilient gel which retained its shape and which could easily be deformed under the influence of a force acting upon it was obtained. This gel resumed its starting state after removal of the deforming force.

EXAMPLE 10

This Example illustrates use of plasticizers in making gels suitable for making the gel pads of the present invention. 490 parts of a polyether based on trimethylolpropane with a hydroxyl number of 56 (prepared from 45% of propylene oxide and 55% of ethylene oxide), 480 parts of dibutyl adipate, 30 parts of the isocyanate used in Example 1 and 15 parts of dibutyl-tin dilaurate were reacted in the manner described in Example 7. A soft, resilient gel which retained its shape and which could easily be deformed under the influence of a force acting upon it was obtained. This gel resumed its starting state after removal of the deforming force.

EXAMPLE 11

This Example also illustrates the use of plasticizers in making gels suitable for the gel pads of the present invention. 508 parts of the polyether of Example 10, 450 parts of an alkylsulfonic acid ester of phenol, 27 parts of the polyisocyanate of Example 1 and 15 parts of dibutyl-tin dilaurate were reacted in the manner described in Example 7. A soft, resilient gel which retained its shape and which could easily be deformed under the influence of a force acting upon it was obtained. This gel resumed its starting state after removal of the deforming force.

EXAMPLE 12

484 parts of the polyether described in Example 10, 450 parts of an alkylsulfonic acid ester of phenol, 51 parts of the isocyanate of Example 8 and 15 parts of dibutyl-tin dilaurate were reacted by the same procedure that is described in Example 7. A soft, resilient gel which retained its shape and which could easily be deformed under the influence of a force acting upon it was obtained. This gel resumed its starting state after removal of the deforming force.

What is claimed is:

1. A pad in which a gel is present within a flexible, resilient casing in which the gel comprises:
   (a) 15-62 weight % (based on (a)+(b)) of a high molecular weight covalently cross-linked polyurethane matrix;
   (b) 85-38 weight % (based on (a)+(b)) of a liquid dispersing agent which is a polyhydroxy compound having an average molecular weight between 1,000 and 12,000 and an OH number between 20 and 112 and which contains essentially no hydroxy compounds with a molecular weight below 800; and
   (c) 0-100 weight % (based on (a)+(b)) fillers and/or additives.

2. The pad of claim 1 in which the gel comprises:
   (a) 20-57 weight % polyurethane matrix; and
   (b) 80-37 weight % liquid dispersing agent.

3. The pad of claim 1 in which the gel comprises:
   (a) 25-47 weight % polyurethane matrix; and
   (b) 75-53 weight % liquid dispersing agent.

4. The pad of claim 1 in which the polyurethane matrix is a reaction product of a polyisocyanate and a polyhydroxyl compound having an average molecular weight between 1,000 and 12,000 and an OH number between 20 and 112 in which the product of the NCO functionality of the polyisocyanate and the OH functionality of the polyhydroxy compound is at least 5.2.

5. The pad of claim 4 in which the polyhydroxy compound has a molecular weight between 1,700 and 6,000, and an OH number between 28 and 84.

6. The pad of claim 5 in which the product of the functionalities is at least 6.2.

7. The pad of claim 1 wherein the liquid dispersing agent contains essentially no hydroxy compounds having a molecular weight below 1,000.

8. The pad of claim 1 in which the flexible resilient casing is a polymer film or a coated textile.

9. A process for the production of a pad in which a gel is present within a flexible resilient casing comprising:
   (a) mixing
      (i) a polyisocyanate having a characteristic isocyanate number between 15 and 60;
      (ii) a polyhydroxy compound having a molecular weight between 1000 and 12,000 and an OH number between 20 and 112;
      (iii) any appropriate catalyst for the reaction between isocyanate and hydroxyl groups; and
      (iv) any desired filler and or additive
   in a manner such that essentially no hydroxy compound having a molecular weight less than 800 is present, and the product of the functionalities of the polyurethane-forming components is at least 5.2;
   (b) allowing the mixture to gel; and
   (c) providing a flexible resilient casing for the gel, the gel is present within the casing.

10. The process of claim 9 in which the polyhydroxy compound has a molecular weight between 17,000 and 6,000 and an OH number between 28 and 84.

11. The process of claim 10 in which the product of the functionalities is at least 6.2.

12. The process of claim 9 in which the product of the functionalities is at least 10.

13. The process of claim 9 in which the mixture prepared in (a) is introduced into an open flexible resilient casing and the casing is sealed before the mixture is allowed to gel.

14. A pad suitable for use as a mattress, mattress insert, wheelchair cushion, bicycle saddle, car seat, car seat support or pad element for upholstered furniture in which a gel is present within a flexible resilient casing wherein the gel comprises:
   (a) 15-62 weight % (based on (a)+(b)) of a high molecular weight covalently cross-linked polyurethane matrix;
   (b) 85-38 weight % (based on (a)+(b)) of a liquid dispersing agent which is a polyhydroxy compound having an average molecular weight between 1,000 and 12,000, an OH number between 20 and 112 and which contains essentially no hydroxy componds with a molecular weight below 800; and
   (c) 0-100 weight % (based on (a)+(b)) fillers and/or additives.

* * * * *